(12) United States Patent
Rosenberg et al.

(10) Patent No.: US 6,343,788 B1
(45) Date of Patent: Feb. 5, 2002

(54) MULTISTABLE MECHANICAL SWITCHING DEVICE

(76) Inventors: Bruce Lamar Rosenberg, 23 N. Chelsea Ave., Atlantic City, NJ (US) 08401; Daniel Bruce Rosenberg, 71 Walnut St., Arlington, MA (US) 02476

( * ) Notice: Subject to any disclaimer, the term of this patent is extended or adjusted under 35 U.S.C. 154(b) by 0 days.

(21) Appl. No.: 09/371,756

(22) Filed: Aug. 10, 1999

Related U.S. Application Data

(63) Continuation of application No. 08/901,567, filed on Jul. 28, 1997, now Pat. No. 5,924,692.

(51) Int. Cl.[7] .................................................. A63F 9/00
(52) U.S. Cl. ................................ 273/153 S; 273/153 R
(58) Field of Search ........................ 273/153 R, 153 S, 273/157 R; 40/905; 401/131, 49; 206/214; 473/594; 220/735; 229/87.01, 87.03, 87.13

(56) References Cited

U.S. PATENT DOCUMENTS

| | | | | | |
|---|---|---|---|---|---|
| 132,562 | A | * | 10/1872 | Cleveland | 206/214 |
| 1,257,432 | A | * | 2/1918 | Wetzel | 273/157 R |
| 1,709,660 | A | * | 4/1929 | De Bracht | 273/157 R |
| 2,913,789 | A | * | 11/1959 | Loredo | 401/131 |
| 3,026,847 | A | * | 3/1962 | Anderson, Jr. | 40/905 |
| 3,201,894 | A | * | 8/1965 | Resch | 273/157 R |
| 4,588,387 | A | * | 5/1986 | Swenson | 446/130 |
| 4,796,891 | A | * | 1/1989 | Milner | 273/153 S |
| 5,238,114 | A | * | 8/1993 | Irozuru | 229/87.01 |
| 5,924,692 | A | * | 7/1999 | Rosenberg | 273/153 S |

* cited by examiner

*Primary Examiner*—Steven Wong

(57) ABSTRACT

This invention is a multistable mechanical switching device. It is a bundle of rods surrounded by elastic, which when manipulated can be made to change from one stable close-packed state to another, causing a sudden rearrangement of the rods within the bundle, and producing a snapping noise or click which can be heard and felt with the fingers, interesting visual effects due to the rearrangement of the rods, and various switching and signaling effects. Possible applications of this invention are electrical switches, electronic logic, locks, medical devices, amusement devices, puzzles, science education, toys, executive pacifiers, hand exercisers, and physics and materials science demonstrations.

4 Claims, 4 Drawing Sheets

MULTISTABLE MECHANICAL SWITCHING DEVICE

BACKGROUND OF THE INVENTION

This invention is a continuation relative to USPTO application Ser. No. 08/901,567 filed Jul. 28, 1997 by Bruce L. Rosenberg, which issued on Jul. 20, 1999 as U.S. Pat. No. 5,924,692.

BRIEF SUMMARY OF THE INVENTION

This invention relates to mechanical devices containing a bundle of independent, but interacting elements. The interactions among the elements provide switching actions that create differing effects for differing configurations of the elements.

This invention is a multistable mechanical switching device consisting of a compact bundle of independent extended elements, wherein a centrally-acting elastic containing means causes compaction and mutual constraint among the elements, allowing the existence of a number of possible, stable configurations of the elements. Application of sufficient force in appropriate spots on the perimeter of the bundle can overcome the energy barrier imposed by the containing means and result in a rapid rearrangement of the elements from one stable configuration into another. Interactive components or connecting means may be attached to or contained within the elements to provide different effects, depending upon the different relative arrangements of the interactive elements.

Each element can be in contact with up to 6 of its neighbors, allowing for a number of different possible interactions. One way these interactions can occur is through electrical contacts in the form of two or more circumferential rings spaced along the length of the elements.

CROSS REFERENCES TO RELATED APPLICATIONS

This invention differs from U.S. Pat. No. 5,924,692 in that the bundle of elements may contain ordinary and active components. In the above patent, all the extended elements in close contact were not active and only "interacted" mechanically. That is, the previously disclosed "ordinary" elements occupied space within the bundle, transferred mechanical forces, moved when sheared, impacted other elements when the bundle experienced a sudden rearrangement, and presented changing patterns due to their different markings. The manifestations of the sudden rearrangement of these ordinary elements were through seeing the change in the pattern of the differently marked ends of the elements, in feeling the rapid change in shape, and in hearing the snapping sound of the elements impacts. In the current invention, an "active" element manifests itself in the above ordinary, mechanical visual, tactile and auditory ways and in addition may actively emit light, tones, or other signals. In contrast to the invention shown in U.S. Pat. No. 5,924,692, which used only ordinary elements, the current invention may employ a combination of ordinary and active elements. The ordinary elements perform the function of insulating, isolating, or separating active elements, preventing their activation until they come in contact as will be shown in the drawings. The active elements in the following drawings are biactive. Biactive elements are activated when they come in contact with another biactive element of appropriate type and remain activated until separated by an ordinary element. Triactive elements are activated when three elements of appropriate type come in contact with each other and remain activated until separated by an ordinary element. The generic term "polyactive" will be used to refer to biactive, triactive, and higher type elements. A bundle of ordinary and active elements will be referred to hereafter as "interactive".

STATEMENT OF THE PRIOR ART

This invention differs from prior art switching devices in that the switching elements are independent and can change positions relative to each other. In prior art the switching elements are constrained relative to an insulating substrate and one or more of the elements move, pivot, rotate, snap or slide relative to the fixed elements. Here, all the elements are movable relative to each other.

The expansion of volume on shear is called "volumetric dilatancy". The analysis of the subject invention using elongated elements is particularly simple, since the shear occurs only in two, not three dimensions. Osborne Reynolds first described volumetric dilatancy in Reynolds, O., "On the Dilatancy of Media Composed of Rigid Particles in Contact" *Philosophical Magazine*, 20 (S5), pp. 469–481, December 1885. In this article Reynolds describes the enclosing of a mass of solid particles or balls inside an elastic, closed envelope (latex balloon). Volumetric dilatancy is the tendency of a granular medium to expand upon shear. It has more recently been called a "locking solid". This behavior can be most easily understood by the change that occurs when the plastic envelope of a vacuum-packed package of coffee is pierced. What was a solid, hard block of compressed coffee granules suddenly becomes a loose, pliable bag of free flowing granules.

Subsequently, Reynolds developed a theory of the structure of space, gravity, and electromagnetism in which volumetric dilatancy played an essential part: Reynolds, 0., Papers on Mechanical and Physical Subjects, Vol. 111, *The Submechanics of the Universe*, Cambridge: at the University Press, 1903, and Reynolds, 0., *On an Inversion of Ideas as to the Structure of the Universe* (The Rede Lecture, Jun. 10, 1902), Cambridge: at the University Press, 1903. In these documents, among much else, Reynolds explains light waves as transverse vibrations in a mechanical, granular medium (or aether) caused by "reversions of complex inequalities", i.e., by a snapping back of grains into close packing, an action that is made audible and tactual in the subject invention.

The previously described volumetric dilatant devices of Reynolds, while capable of producing a locking solid, use a plurality of uniform, near-spherical grains, not elongated elements of constant cross-section as taught herein. In addition, herein, the visibility of the ends of the elements allows changes in their relative positions and groupings to be seen and the interaction of the elements produces various other effects.

Examples of patents teaching compact bundle formation of elongated elements are found in U.S. Pat. Nos. 3,956,982 to Hill and Wynn, issued May 18, 1976 and 4,174,662 to Klusmier, issued Nov. 20, 1979. These patents describe devices to facilitate the assembly and fastening of bundles into a stable, unchanging configuration and do not deal with the dynamic and geometric properties of rearrangements of elements within the bundle nor their interactions as in the subject invention.

A theoretical physics approach is taken to mathematically describing arrangements of compacted finite systems of rigid elements in Stillinger, F. H. Jr. and Salzburg, Z. W., "Limiting Polytope Geometry for Rigid Rods, Disks, and Spheres", pp.179–225, *Journal of Statistical Physics*, Vol. 1, No. 1, 1969. A polytope is the "limiting high-compression region" of a finite system of rods, disks or spheres. The subject invention provides a method for physically modeling and visually and tactually exploring the theoretical results for the 2-dimensional elongated element examples of Stillinger and Salzburg; but is in no way disclosed by their article.

It is believed that the subject invention is a novel way of implementing a multistable mechanical switching device with minimal means, inexpensively and effectively.

BRIEF DESCRIPTION OF THE DRAWINGS

FIG. 9 shows an end view of the bundle with lamp and power elements isolated from each other by ordinary elements.

FIG. 10 shows an end view of a bundle in the process of switching.

FIG. 11 shows an end view of the state of the bundle after switching with lamp and power elements in contact and the lamp illuminated.

FIG. 12 shows an end view of the bundle with indicator and power elements isolated from each other by ordinary elements.

FIG. 13 shows an end view of the bundle in the process of rearrangement of the elements.

FIG. 14 shows an end view of the state of the bundle in a new stable arrangement with the indicator elements in contact with the power elements and activated.

FIG. 15 15 shows cut away details of a biactive element with four peripheral electrical contacts wired in a direct connection circuit.

FIG. 16 shows cut away details of a biactive element with four peripheral electrical contacts wired in a reversing connection circuit.

FIG. 17 shows cut away details of a biactive element with four peripheral electrical contacts with a battery connected across the two right-most contacts and two incandescent lamps connected across the two leftmost contacts. Each lamp is connected in series with opposing polarity diodes so as to indicate the polarity of the applied voltage.

FIG. 18 shows cut away details of the biactive elements from FIGS. 15 and 17 in contact. Because direct connection is used the polarity of the voltage applied to the lamps is positive and the upper lamp lights while the lower does not.

FIG. 19 shows cut away details of the biactive elements from FIGS. 16 and 17 in contact. Because a reversing connection is used, the polarity of the voltage applied to the lamps is negative and the lower lamp lights while the upper does not. This is a simple demonstration of logical functions, which can be implemented with multiple connections along the lengths of the active elements.

DETAILED DESCRIPTION

Figure 1:
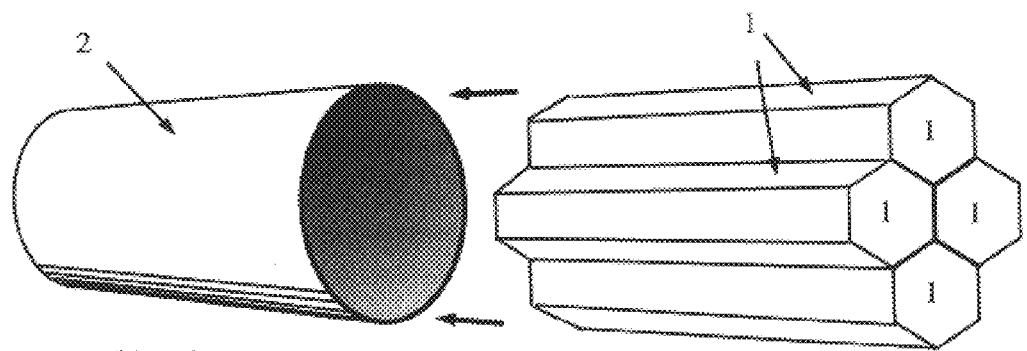
FIG. 1 shows a perspective view of a bundle of four elements being inserted into a centrally acting containing means or elastic tube open on both ends.
Figure 2:
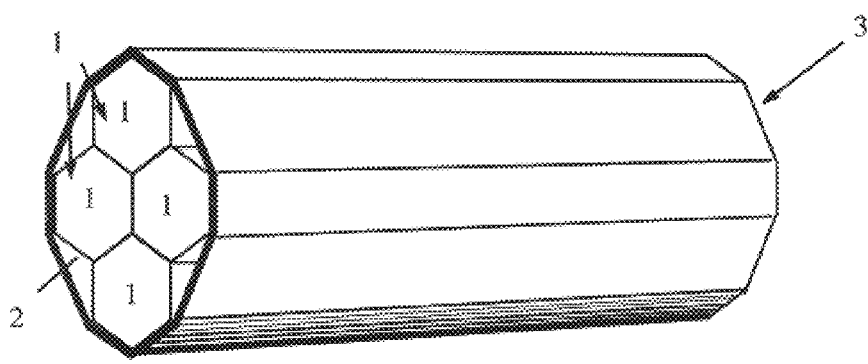
FIG. 2 shows a perspective view of the bundle of four elements enclosed in an elastic tube open on both ends.
Figure 3:
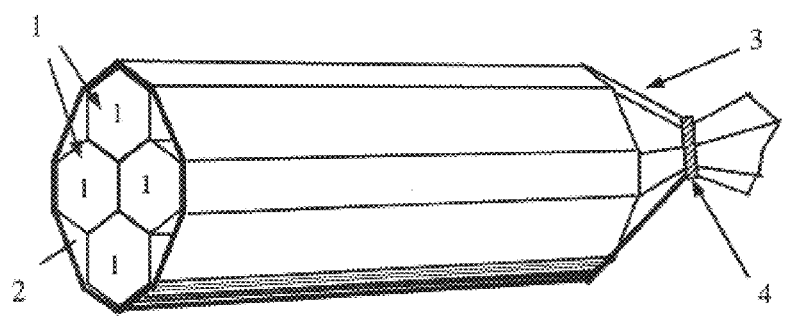
FIG. 3 shows a perspective view of the bundle in an elastic tube closed on one end.
Figure 4:
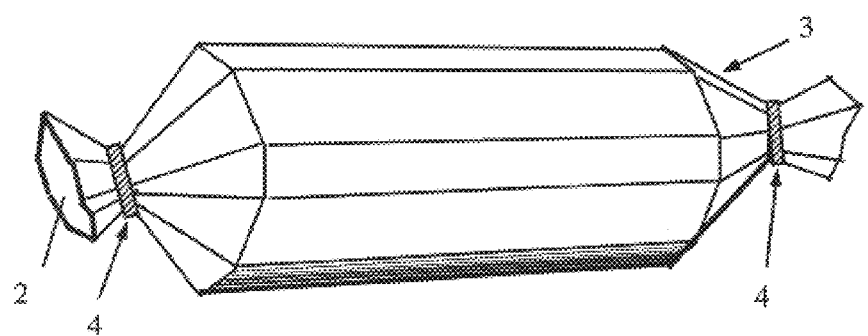
FIG. 4 shows a perspective view of the bundle in an elastic tube closed on both ends.

FIG. 1 shows a perspective view of a bundle of four independent elongated rigid ordinary elements 1 being inserted into a centrally acting containing means or elastic tube 2 open on both ends. FIG. 2 shows a perspective view of the bundle 3 of four ordinary elements 1 enclosed in an elastic tube 2 open on both ends. FIG. 3 shows a perspective view of the bundle 3 of four ordinary elements 1 in an elastic tube 2 closed on one end by a clamp 4. FIG. 4 shows a perspective view of the bundle 3 in an elastic tube 2 closed on both ends by clamps 4.

Figure 5:
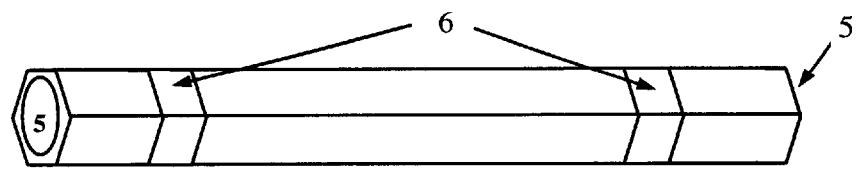
FIG. 5 shows a perspective view of the outside appearance of an active electrical lamp element.
Figure 6:
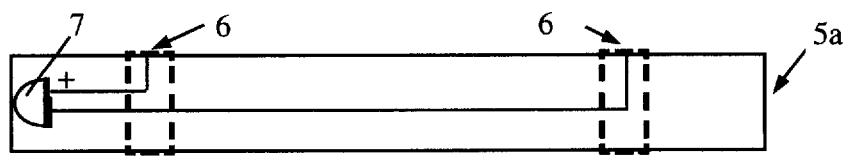
FIG. 6 shows cutaway-drawing details of an electrical lamp element.
Figure 7:
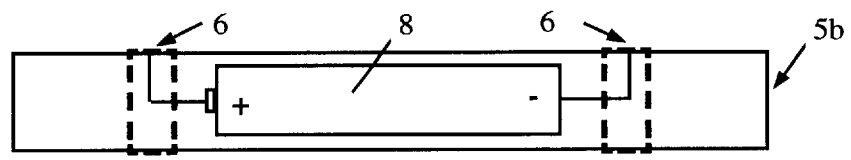
FIG. 7 shows cutaway-drawing details of an electrical power element.
Figure 8:
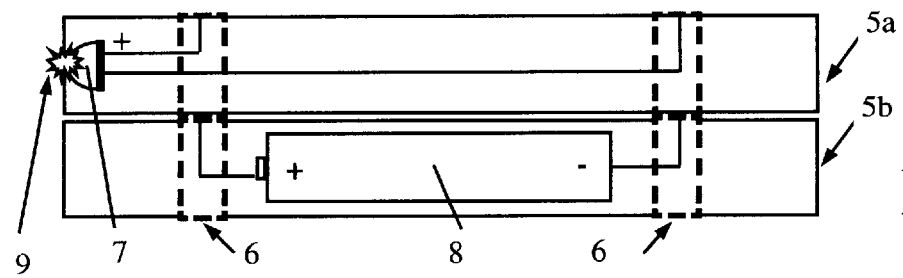
FIG. 8 shows the lamp and power elements in series connection with the lamp element illuminated.
Figure 9:
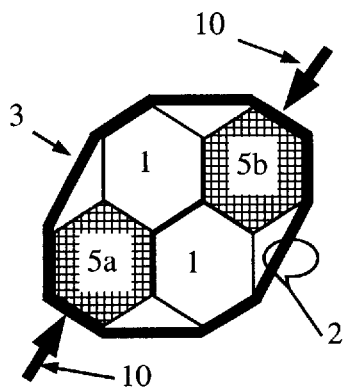
FIGS. 9 through 11 show the progression of the switching action in a bundle of four elements.
Figure 10:
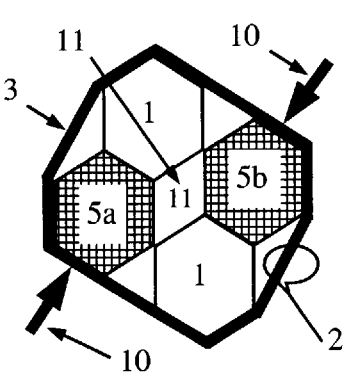
Figure 11:
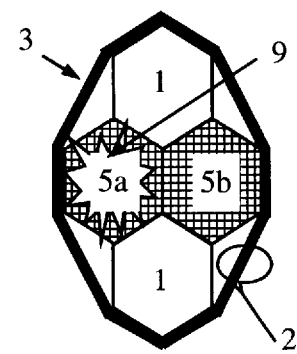

FIG. 5 shows a perspective view of the outside appearance of an independent elongated rigid biactive element 5 showing peripheral electrical contacts 6. FIG. 6 shows cutaway drawing details of a biactive lamp element 5*a* showing two circumferential electrical contacts 6 and a light emitting diode (LED) 7. FIG. 7 shows cutaway drawing details of a biactive power element 5*b* showing two circumferential electrical contacts 6 and a battery 8. FIG. 8 shows the biactive lamp and power elements 5*a* and 5*b* with their circumferential electrical contacts 6 touching, allowing a flow of current from the battery 8 through the light emitting diode 7 illuminating it 9. Note that the completed circuit is a series connection. As will be shown, more complex electrical switching and logic circuits can be achieved by the addition of more circumferential electrical contacts. Also, signaling devices such as buzzers, vibrators, flashing lamps, loudspeakers, and so forth can be substituted for the LED shown above. FIGS. 9 through 11 show end views of the mechanical progression of the deformation of the bundle of four independent elongated rigid elements resulting in a bistable switching action. FIG. 9 shows an end view of the bundle 3 with the lamp and power elements 5*a* and 5*b* separated from each other by two ordinary elements 1, held compactly in place by a centrally-acting containing means or stretched elastic tube 2, and the initial shearing or compressive force shown with bold arrows 10. FIG. 10 shows the bundle 3 in a state of maximum deformation due to continued application of the compressive force 10 with relative movement, i.e., shear, of the elements 1 and 5*a* relative to elements 1 and 5*b* creating an open interstice space 11 and maximally stretching the containing elastic tube 2. FIG. 11 shows an end view of the final stable state of the bundle 3 after switching with the lamp and power elements 5*a* and 5*b* in contact and lamp 7 illuminated 9.

Figure 12:
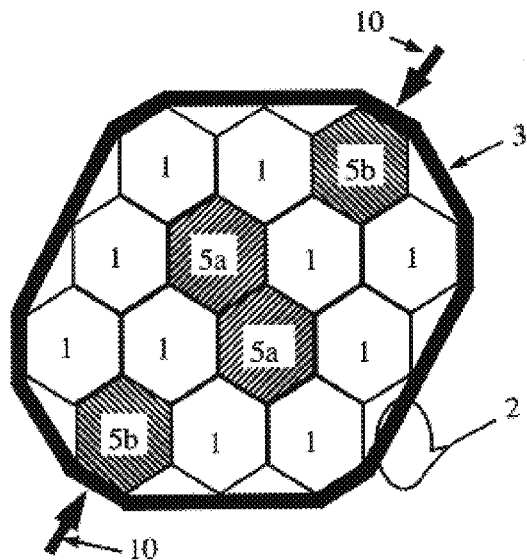
FIGS. 12 through 14 show end views of the progression of switching action in a multistable bundle consisting of fourteen elements with two indicator biactive elements like those shown in FIG. 6 and two power elements like those shown in FIG. 7.
Figure 13:
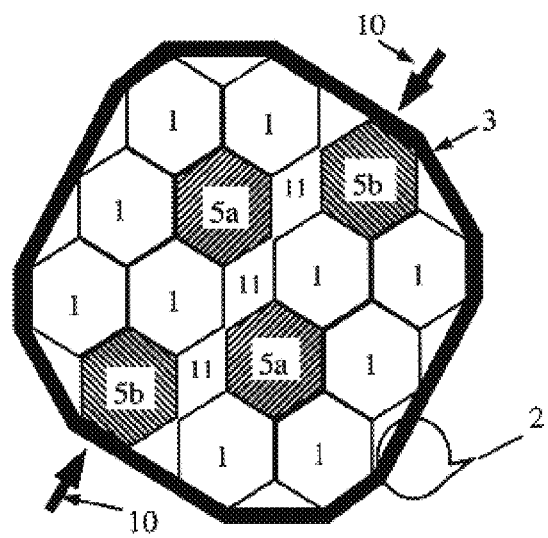
Figure 14:
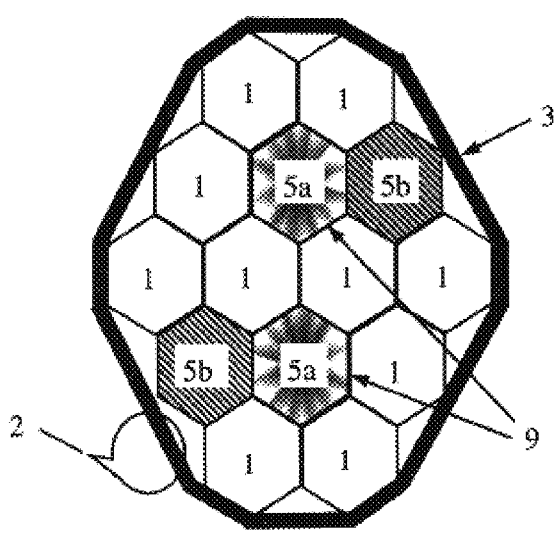

FIGS. 12 through 14 show end views of three stages in the progression of switching action in a multistable bundle consisting of fourteen independent elongated rigid hexagonal elements with two lamp elements 5a like those shown in FIG. 6 and two power elements 5b like those shown in FIG. 7. FIG. 12 shows an end view of the bundle 3, surrounded by a centrally-acting containing means or elastic tube 2, with lamp elements 5a separated from the power elements 5b by ordinary elements 1 and a shearing force 10 being exerted on opposite sides of the bundle. FIG. 13 shows an end view of the bundle 3 in the process of switching with the interstices 11 between the elements being at a maximum. FIG. 14 shows an end view of the state of the bundle 3 in a new stable arrangement with the lamp elements 5a in contact with the power elements 5b and illuminated 9.

Figure 15:
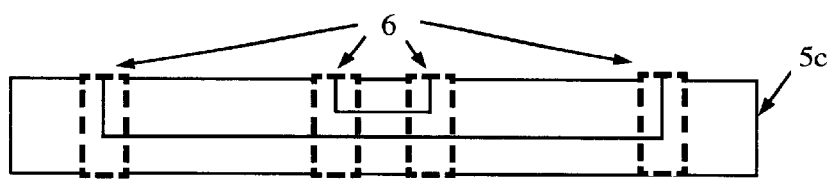
FIGS. 15 through 19 show how more complex electrical switching and logic functions can be accomplished by the addition of more contacts along the length of the biactive elements.
Figure 16:
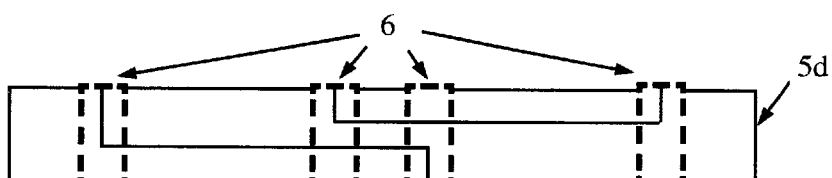
Figure 17:
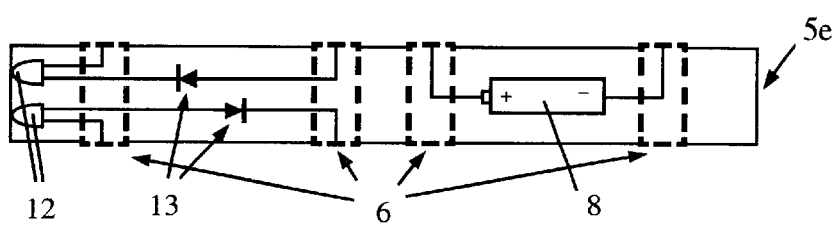
Figure 18:
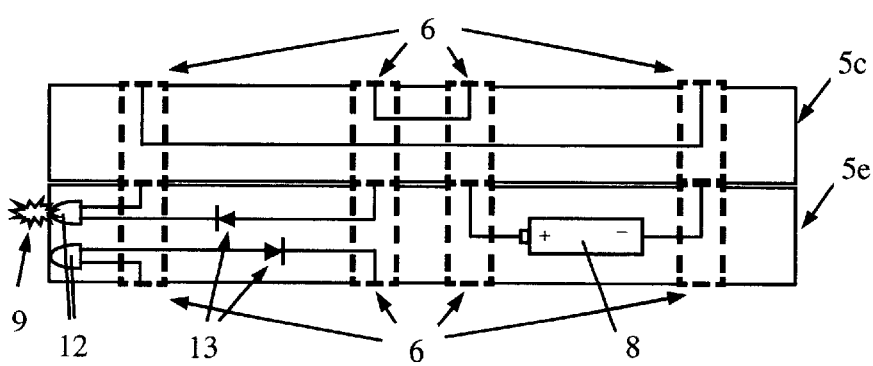
Figure 19:
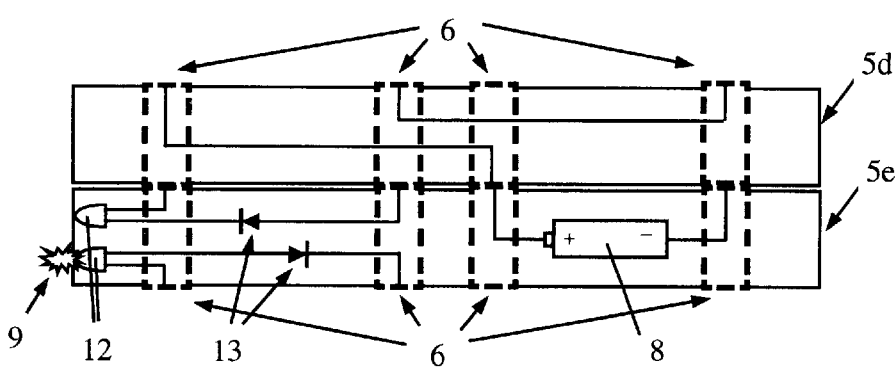

FIGS. 15 through 19 show how more complex electrical switching and logic functions can be accomplished by the addition of more contacts along the length of the independent elongated rigid elements. FIG. 15 shows cut away details of a biactive element 5c with four peripheral electrical contacts 6 wired in a direct connection circuit. FIG. 16 shows cut away details of a biactive element 5d with four peripheral electrical contacts 6 wired in a reversing connection circuit. FIG. 17 shows cut away details of a biactive indicator element 5e with four peripheral electrical contacts 6 with a battery 8 connected across the two rightmost contacts and two incandescent lamps 12 connected across the two leftmost contacts. Each lamp is connected in series with opposing polarity diodes 13 so as to indicate the polarity of the applied voltage. FIG. 18 shows cut away details of biactive elements 5c and 5e from FIGS. 15 and 17 in contact. Because direct connection is used, the polarity of the voltage applied to the lamps 12 is positive and the upper lamp lights 9 while the lower does not. FIG. 19 shows cut away details of biactive elements 5d and 5e from FIGS. 16 and 17 in contact. Because a reversing connection is used, the polarity of the voltage applied to the lamps 12 is negative and the lower lamp lights 9 while the upper does not. This is a simple demonstration of logical functions that can be implemented with multiple connections along the lengths of the active elements.

It is to be understood that devices with other numbers and types of interactive elements and other numbers and types of interconnections may show even more interesting behavior than those described above and shown in the drawings and that the embodiments described above are illustrative and not limiting, with the scope of the invention being defined in the claims which follow.

What is claimed is:

1. A multi-stable mechanical switching device comprising a plurality of elongated elements of substantially uniform hexagonal cross-section held in a tight bundle by an inward, centrally acting containing member such that appropriate pressure on the sides of the bundle causes transverse shearing of the bundle and rearrangement of the elements; further wherein interactive components are variously contained within selected elements to provide signaling effects when the act of rearrangement causes selected elements to come into contact with other selected elements activating the interactive components of the selected elements in mutual contact and producing signaling effects depending upon the predetermined interactive properties of the selected elements in mutual contact.

2. The multi-stable mechanical switching device of claim 1 wherein the interactive components in the selected elements variously comprising electrically conducting contacts spaced along the length of the elements, a power source, interconnecting wires, and a signaling device; such that the act of rearrangement causes the electrically conducting contacts of selected elements to come in mutual contact with other contacts of other selected elements to conduct electrical current through interconnecting wires to the signaling devices of the selected elements in mutual contact to produce various signaling effects depending upon the predetermined interactive properties of the selected elements in mutual contact.

3. A multi-stable mechanical switching device comprising a plurality of elongated elements held in a tight bundle by an inward, centrally-acting containing member such that appropriate pressure on the sides of the bundle causes transverse shearing of the bundle and rearrangement of the elements; further wherein the interactive components contained within selected elements variously comprising electrically conducting contacts spaced along the length of the elements, a power source, interconnecting wires, and a signaling device; such that the act of rearrangement causes the electrically conducting contacts to come in mutual contact with other contacts of other selected elements to conduct electrical current through interconnecting wires to the signaling devices of the selected elements in mutual contact to produce various signaling effects.

4. A multi-stable mechanical switching device comprising a plurality of substantially identically-shaped, hexagonal rods held in a tight bundle by an inward, centrally acting means such that appropriate pressure on the sides of the bundle causes transverse shearing of the bundle and relative movement among the elements; further wherein interactive electrical components variously comprising electrically conducting contacts spaced along the length of the elements, a power source, interconnecting wires, and a signaling device; are contained within selected elements to provide different signaling effects when the relative movement of the elements causes the electrically conducting contacts of selected elements to come in mutual contact with other contacts of other selected elements to conduct electrical current through interconnecting wires to the signaling devices of the selected elements in mutual contact to produce various signaling effects depending upon the predetermined interactive properties of the selected elements in mutual contact.

* * * * *